Patented May 18, 1954

2,678,935

UNITED STATES PATENT OFFICE 2,678,935

PROCESS FOR POLYOXYETHYLATION OF NONHYDROXYL CONTAINING ESTERS

Robert L. Sundberg, Phillipsburg, N. J., and Max E. Chiddix, Easton, Pa., assignors to General Aniline & Film Corporation, New York, N. Y., a corporation of Delaware No Drawing. Application December 29, 1950, Serial No. 203,573

11 Claims. (Cl. 260—410.6)

This invention relates to a process for the preparation of condensation products of non-hydroxyl containing esters with alkylene oxides and particularly fats and oils which contain glycerol completely esterified with fatty acids.

It has been known that hydroxyl containing oils such as castor oil can react with ethylene oxide. Now it has been discovered that nonhydroxyl containing esters such as waxes, fats and oils can be made to react at relatively low temperature with ethylene oxide to form products of good appearance and having good emulsifying properties.

The reaction may be represented as follows:

1.

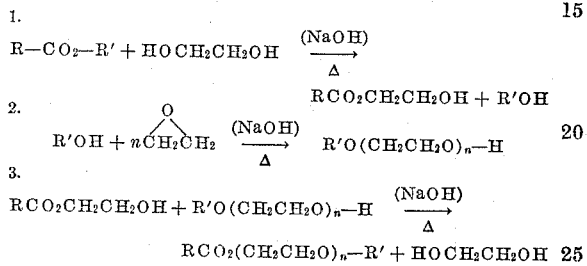

where R and R' are alkyl groups and $n$ is an integer.

While it has been known (United States Patent Number 1,970,578) that ethylene oxide would react readily with compounds such as acids and alcohols containing reactive hydrogen atoms under the influence of alkaline catalysts, it was not known that a transesterification or ester interchange reaction could be carried out simultaneously if esters are present. The results obtained by us indicate that transesterification takes place under milder conditions if there is a simultaneous reaction of ethylene oxide with the alcohol present.

The process comprises adding to the wax, fat, or oil a small amount of alkaline catalyst and a small amount of a substance containing a reactive hydrogen atom such as organic acids, alcohols, amides, primary or secondary amines, mercaptans, phenols, enols, or any substance which will react with ethylene oxide to form hydroxyethyl derivatives. Especially useful are water, methanol, and ethylene glycol. After heating the reaction mixture to 80 to 180° C. (but preferably at 130–140° C.) gaseous or liquid ethylene oxide is then admitted portionwise or in a slow continuous stream to the reaction mixture with good agitation. Products with widely varying mol ratios of ethylene oxide to ester may be made by this method.

The following alkaline catalysts are suitable for this reaction: sodium hydroxide, potassium hydroxide, cesium hydroxide, rubidium hydroxide, quaternary amine hydroxides and low-molecular weight trialkyl amines.

Examples of substances containing active hydrogen to promote the reaction are tall oils, abietic acid, acetic acid, propionic acid and fatty acids, oxalic acid, citric acid, maleic acid, phthalic acid, ethylene glycol, diethylene glycol or polyethylene glycol (and the propylene glycol analogues), methanol, ethanol, isopropanol, butanol and higher homologues, acetanilide, benzamide, acetamide and the amides of higher molecular weight fatty acids, the low and higher molecular weight homologues of primary, secondary and tertiary amines, such as methyl amine, dimethylamine and trimethylamine, aniline, naphthylamine, various mercaptans such as octyl mercaptan, dodecyl mercaptan, thiophenol, dithioglycol, dithiodiglycol, phenol, amylphenol, butylphenol, octylphenol, hydroquinone, pyrogallol.

Alkylene oxides capable of reacting in the manner described above include ethylene oxide, propylene oxide, glycidol, epichlorohydrin, butadiene monoxide, isobutylene oxide and styrene oxide.

The following examples are preferred embodiments of the invention but variations and substitutions may be made within the scope of the claims.

*Example 1*

A mixture of 304 parts by weight peanut oil and 5.6 parts of 40% aqueous KOH was heated in a stainless steel autoclave to 140° C. over a period of about 1 hour and then evacuated to fifteen inches. The vacuum was released immediately with gaseous ethylene oxide from a heated reservoir and the ethylene oxide pressure raised to 25–30 lb. p. s. i. g. Ethylene oxide was passed in continuously at 25–30 lb. pressure from the special reservoir containing a total of 612 parts ethylene oxide. The reaction was completed in 6⅛ hours and the end weight showed an absorption of 586 parts ethylene oxide. The 26 parts' loss was attributed to a leak in the apparatus. If the molecular weight of peanut oil is assumed to be 900, the mol ratio of ethylene oxide to peanut oil is 39.4. The product had a varnish color of 12–13 and a solidification point of 14° C. 20% in kerosene formed a clear solution.

*Example 2*

By the same general procedure and at the reaction conditions described in Example 1, 400.2 parts soybean oil was treated with 685 parts of ethylene oxide using 3.14 parts KOH catalyst and 15.7 parts ethylene glycol. The absorption was complete after 4⅓ hours. Assuming the molecular weight of soybean oil to be 900, the mol ratio of ethylene oxide to soybean oil in the final product (from the end weight) was 35.6. The varnish color no. was 10–11 and the solidification point was 17–18° C.

This product produced a very good emulsion when added to DDT in Velsicol and then the mixture added to water.

*Example 3*

By the same general procedure and at the reaction conditions described in Example 1, 360 parts of soybean oil was treated with 802 parts ethylene oxide using 65.1 parts Arzinol D (tall oil) and 2.63 parts of potassium hydroxide. The absorption of ethylene oxide was complete after 5½ hours. There was obtained 1,228 parts of product having a varnish color of 12 and a solidification point of 20° C. The pH of 10% in distilled water was 9.4. The product was soluble to a clear solution.

Fats and oils are low cost starting materials. When reacted with ethylene oxide by the present process they form valuable emulsifiers, lime soap dispersers, cotton detergents, and other uses now under investigation in the textile, petroleum and insecticide fields.

We claim:

1. A process for the preparation of condensation products of an alkylene oxide with a fatty acid glyceride free of hydroxyl groups, which comprises heating and agitating a mixture comprising said glyceride, said oxide, an alkaline catalyst, and a small amount of a substance containing a reactive hydrogen atom.
2. A process of claim 1 wherein the heating is in the range of 80 to 180° C.
3. A process of claim 2 wherein the glyceride is a solid fat.
4. A process of claim 2 wherein the material containing a reactive hydrogen atom is water.
5. A process of claim 2 wherein the material containing a reactive hydrogen atom is methanol.
6. A process of claim 2 wherein the material containing a reactive hydrogen atom is glycol.
7. A process of claim 2 wherein the glyceride is an oil.
8. A process of claim 7 wherein the material containing a reactive hydrogen atom is water, the alkylene oxide is ethylene oxide and the heating is in the range of 130 to 140° C.
9. A polyoxyalkylated fatty acid glyceride free of hydroxyl groups obtained by the process of claim 1.
10. A product of claim 9 wherein the fatty acid glyceride is soybean oil.
11. A product of claim 9 wherein the fatty acid glyceride is peanut oil.

References Cited in the file of this patent

UNITED STATES PATENTS

| Number | Name | Date |
|---|---|---|
| 2,507,560 | De Groote | May 16, 1950 |